United States Patent [19]
Lambertus

[11] 3,867,082
[45] Feb. 18, 1975

[54] A GRANULATING DEVICE FOR GRANULATING SYNTHETIC PLASTICS MATERIAL IN A FLOWABLE STAGE

[75] Inventor: Friedrich Lambertus, Stuttgart, Germany

[73] Assignee: Werner & Pfleiderer, Stuttgart-Feuerbach, Germany

[22] Filed: July 23, 1973

[21] Appl. No.: 381,763

[30] Foreign Application Priority Data
July 27, 1972 Germany............................ 2236823

[52] U.S. Cl.............. 424/313, 425/382.2, 425/464
[51] Int. Cl............................ B29b 1/03, B29f 3/04
[58] Field of Search ........ 425/308, 314, 382, 382.2, 425/463, 313, 464

[56] References Cited
UNITED STATES PATENTS
1,935,200  11/1933  Bower............................. 425/382.2
3,436,449  4/1969  Treu et al. ...................... 425/311 X
3,516,120  6/1970  Braun et al. .................. 425/382.2 X Primary Examiner—R. Spencer Annear
Attorney, Agent, or Firm—Hane, Baxley & Spiecens

[57] ABSTRACT

There is disclosed an extrusion die for granulating synthetic plastic material in a flowable stage, and more particularly for under-water granulating of the material. The die includes a plurality of nozzle bores extending from the inlet side of the die to the extrusion side thereof. An insulation layer constituted by a gap is interposed between the inlet side and the extrusion side of the die so as to encompass the bores parallel to the same and also crosswise thereto. The extrusion side of the die is cooled by a flow of a coolant, usually water. The material to be granulated is pressure fed to the inlet side of the die and granulated as it emerges from the extrusion side by rotating knives.

9 Claims, 8 Drawing Figures

A GRANULATING DEVICE FOR GRANULATING SYNTHETIC PLASTICS MATERIAL IN A FLOWABLE STAGE

The invention relates to a granulating device for granulating material such as synthetic plastic material delivered to the device in the form of strands, and more particularly, to an extrusion die including an insulation layer for granulating synthetic plastic material under water or submerged in another suitable liquid.

BACKGROUND

There are known extrusion dies of the general kind above referred to which are cooled on the extrusion face side and which are provided with nozzle bores extending through the die in the flow direction of the material and with knives driven past the extrusion side of the die for cutting the extruded material to granules of desired size.

With extrusion dies of this kind a temperature distribution which is an uniform as possible within the location of all the nozzle bores is of crucial importance. A non-uniform cooling of the melt of the synthetic material to be granulated as it passes through the individual bores would cause the melt to flow slower due to its increasing viscosity. As a result, the strands of material would become irregular or even completely clog some of the bores.

The extrusion face side of the die is strongly cooled by the flow of water or other liquid which serves for conveying and cooling the granules. To avoid excessive cooling of the nozzle bores, various modes have been used with extrusion dies as heretofore known. According to an extrusion die as it is disclosed in German Patent DT-As 1,604,336, the heat dissipated by the coolant is restored by intensive heating of the die by means of an extensive and widely branched system of heating ducts. The disadvantage of such system is that manufacture of an extrusion die equipped with the aforereferred to system is very expensive. Moreover, the bores must be relatively long due to the arrangement of the heating ducts, and such great length of the bores requires a high pressure output.

With an extrusion die as it is disclosed in German Patent DT-OS 1,604,344, the individual nozzle bores are equipped with inserts made of material of low heat conductivity. The disadvantage of a die of this type is that the insulation inserts when made of ceramic or glass are easily damaged during operation and particularly when cleaned. If the inserts are made of metal, there is a too high transmission of heat at the areas of contact with the extrusion die. An additional heat insulating layer between the extrusion die and a distributor body disposed anterior of the die cannot effectively prevent these disadvantages.

THE INVENTION

It is a broad object of the invention to provide a novel and improved extrusion die of the general kind above referred to which avoids the aforepointed out disadvantages by assuring a uniform temperature distribution without the range of all nozzle bores — said advantages being obtained at low construction expenses and with a low expenditure of heat energy.

SUMMARY OF THE INVENTION

The aforepointed out objects, features and advantages, and other objects, features and advantages which will be pointed out hereinafter are obtained by providing in the extrusion die an insulation layer which consists of a continuous insulation gap extending in the flow direction of the material and also crosswise thereto and encompassing all nozzle bores located at least within an operational range of the extrusion die.

In the event that large wear and tear on the extrusion die is to be expected by rotating knives, the invention provides as a further advantageous aspect that the insulation gap is defined on the inlet side of the die by a part of the die body including the inlet portion of the bores and on the extrusion side by a ring-shaped insert including the remaining portion of the bores, said insert being detachably mounted on the extrusion side of the die.

According to a further aspect of the invention, the extrusion die can be disassembled without removing screws by providing an extrusion die in which the insulation gap of the die is defined on the extrusion side by a die part containing the extrusion side portions of all the nozzle bores and on the inlet side by an annular insert containing the inlet portion of all the nozzle bores. An embodiment of the extrusion die can be particularly easily operated by subdividing the aforereferred to annular insert.

In the event different sizes of extrusion dies are to be used, the inventory of exchangeable inserts to be maintained can be simplified and reduced by providing according to the invention that the insulation gap is defined by cylindrical inserts each of which includes set off parts of several bores, each constituting the inlet portion thereof and by several bores or recesses in the body of the extrusion die arranged for receiving therein these cylindrical inserts.

A particularly simple and yet hightly effective heat insulation is obtained according to a further aspect of the invention by filling the insulation gap with the same synthetic plastic caused to flow through the extrusion die as such synthetic plastic has inherently a low heat conductivity.

When particularly sensitive synthetic materials are to be processed, interchange of the material to be processed with the material used as filler in the insulation gap is effectively prevented by providing, according to the invention, that the low heating conducting material filling the insulation gap is a synthetic plastic the softening temperature of which is higher than that of the synthetic plastic to be granulated.

The advantages of the invention reside in particular in the highly effective insulation against the strong cooling on the extrusion side of the die. Such high heat insulation and the very uniform temperature distribution over all nozzle bores permit a reduction of the flow through the extrusion die if desirable or necessary, more than it is possible with known types of extrusion dies without risking that the extruded synthetic plastic begins to rigidify while still in the bores. As a result, the finished granulate has a uniformity and quality which was heretofore not obtainable. Moreover, the operational reliability of the granulating insulation including dies according to the invention is much increased. The nozzle bores can be placed closer to each other than was heretofore possible, which in turn results in a higher output per area unit of the die. Due to the shortened length of the nozzle bores, the pressure loss is markedly reduced in a die according to the invention which is, of course, economically highly desirable.

BRIEF DESCRIPTION OF THE INVENTION

In the accompanying drawing, several preferred embodiments of the invention are shown by way of illustration and not by way of limitation.

DETAILED DESCRIPTION OF THE INVENTION

Figure 1:
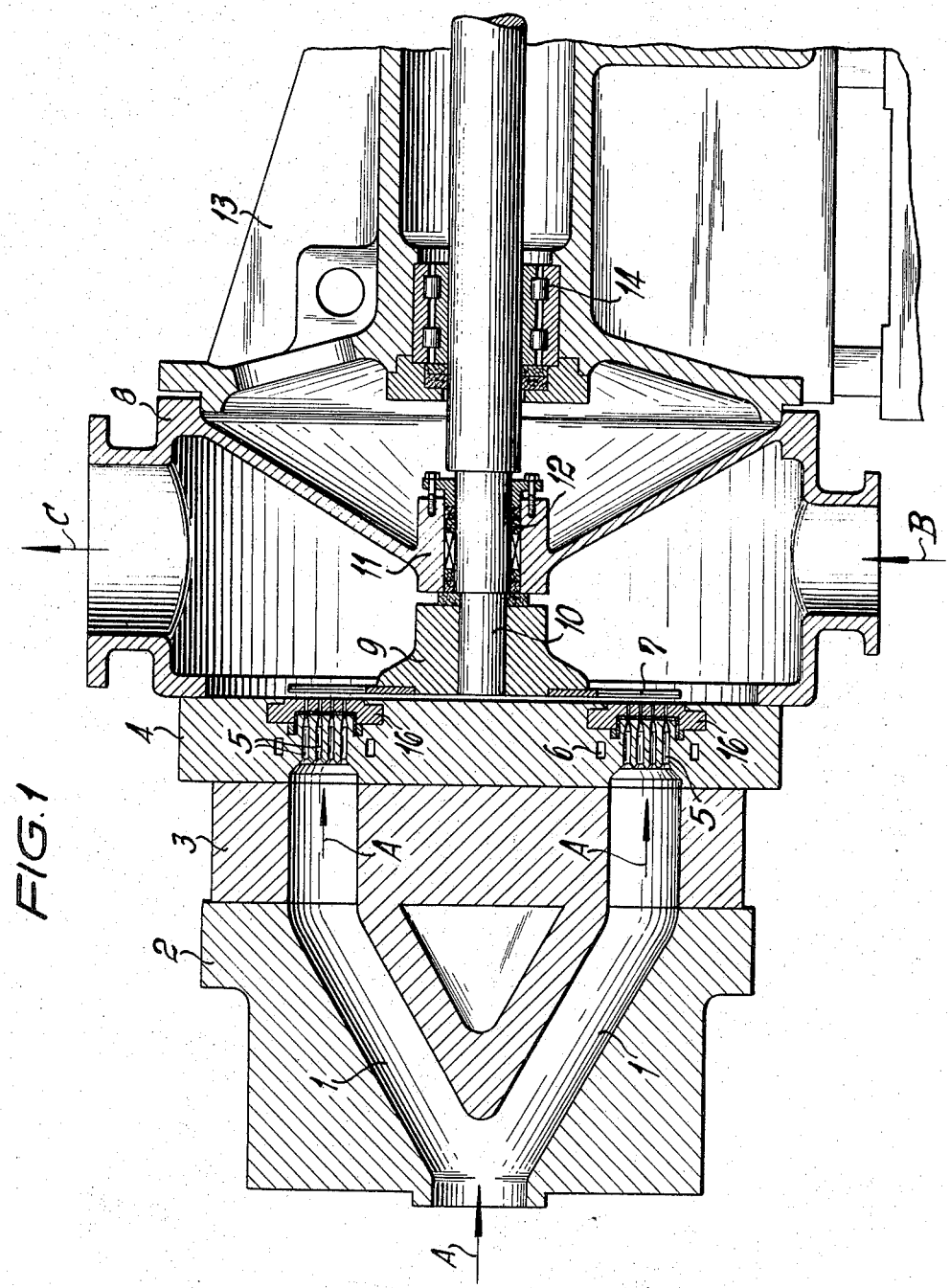
FIG. 1 is a fragmentary sectional view of a device for granulating a melt submerged in a cooling liquid and including an extrusion die according to the invention.

Referring now to the figure more in detail, and first FIG. 1, this figure does not show the entire extruder for the material to be granulated. The extruder may be visualized as a conventional screw extruder having one or more extruder screws and an inlet port for feeding the material to be processed into the casing of the extruder. The material for which the device according to the invention is particularly suitable is a melt of a synthetic plastic. The usefulness of the device according to the invention is not limited to extruders, but any other suitable conveying device may be used, provided only that the device is capable of feeding a synthetic plastic melt or other melt to the extrusion die.

Reverting to FIG. 1, the melt is fed through ducts 1 in a distributor member 2 and an intermediate plate 3 to an extrusion die 4. Arrows A indicate the flow direction of the melt.

The extrusion die comprises a plurality of nozzle bores 5 through which the melt is pressed. Ducts 6 may be provided to permit a flow of a heating medium through the extrusion die. The details of the extrusion die will be fully explained hereinafter.

After passing through bores 5, the individual strands of the synthetic plastic now formed are cut by rotating knives 7 in granules of selected size. To assure that the pressedout strands have the required strength and to avoid that the cut-off strand sections do not stick together, the granulating operation is carried out within a suitable cooling liquid, usually water. A powerful stream of water is caused to flow through a granulating hood or cap 8 which encompasses a cutting head 9 mounting knives 7. An arrow B indicates the inlet side of the cooling medium into hood 9 and an arrow C the outlet side for the cooling medium together with the granules.

Cutting head 9 is mounted on a shaft 10 which extends through a reinforced portion 11 of a wall of the granulating hood 8. Seals 12 are preferably provided to seal off the passage opening for the shaft. A housing 13 which is only partly shown includes bearings 14 for shaft 10 of the cutting head. The drive means for the cutting head is not shown; it should be visualized to be suitably coupled to shaft 10.

Figure 2:
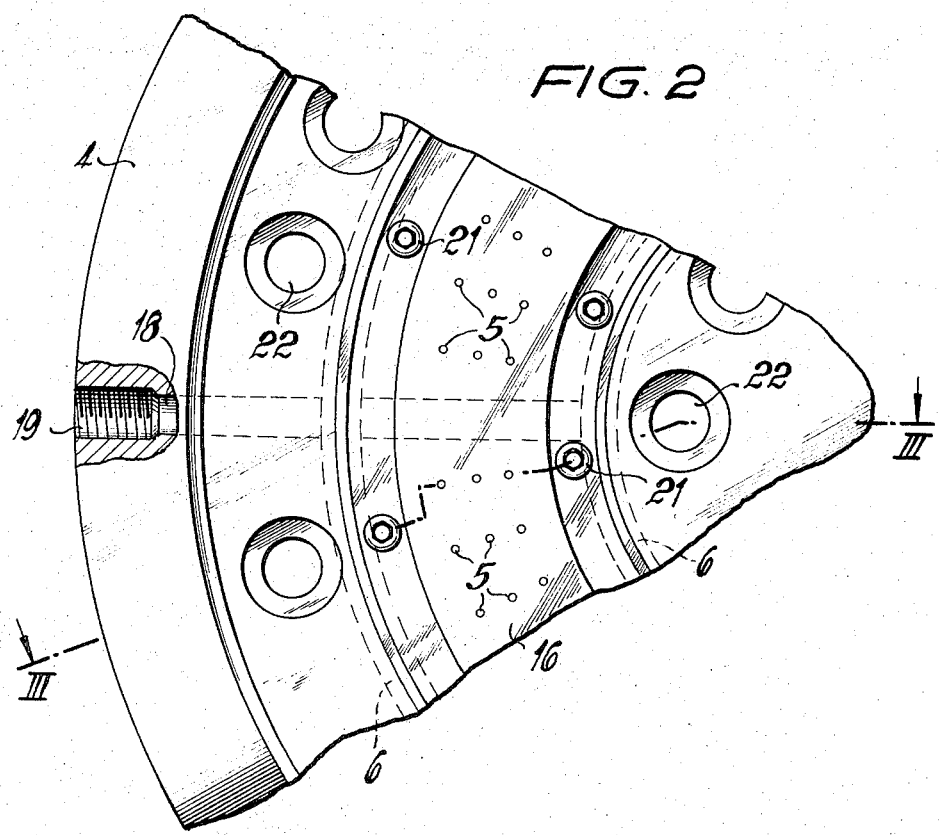
FIG. 2 is a fragmentary plan view of the extrusion side of an extrusion die according to the invention, said die having an annular insert on its extrusion side.
Figure 3:
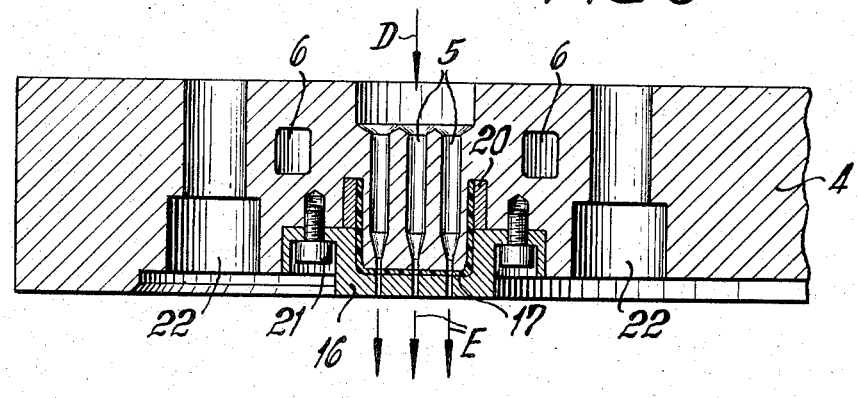
FIG. 3 is a section of the extrusion die according to FIG. 2 taken along line III—III.

As it is shown in FIGS. 2 and 3, the circular extrusion die 4, only part of which is illustrated in these figures, comprises groups of bores 5 arranged along several concentric circles. These bores define two different portions. On the inlet side for the synthetic plastic (arrow D in FIG. 3), the bores extend through the body of the extrusion die while on the extrusion side (arrows E) the bores extend through a detachable insert 16. An insulation gap 17 is left between the part of the extrusion die 4 including the bores and the insert 16. The gap is filled with a suitable material having a low heat conductivity coefficient. It is possible and often convenient to use as filler material the synthetic plastic material which is to be granulated. This material will penetrate into insulation gap 17 when the granulating device is first started. As the material hardens due to being cooled, it will remain in the gap. Tests have shown that in this simple manner a surprisingly satisfactory insulation action is automatically obtained.

Generally, bores 5 have a larger diameter on the inlet side than on the extrusion side. The conical transition portion between the two diameters of the bores is disposed directly ahead of insulation gap 17. As a result, the melt while in the conical portion of the bores, will not cool and thus become adhered to the wall parts of the bores constituting the conical portion thereof. Cooling of the melt in the cylindrical portions of the bores on the extrusion side of the die does not cause adhesion of the material to the walls of the bores and thus of clogging.

It is also possible and sometimes advantageous to insert into the insulation gap a sheet of fiberglass which is saturated with synthetic plastic melt as the same penetrates into the gap thereby reinforcing the fiberglass sheet. It has also been found that hardening synthetic materials are suitable as insulation material and also snythetic plastics which have a higher softening temperature than the synthetic plastics to be granulated, (for instance PTFE). Other heat retaining substances such as mats formed of asbestos fibers may also be used. Generally, it is advisable to ascertain the material which is particularly suitable as insulation material for the specific synthetic plastic to be granulated by simple tests as are known to experts in the art.

The face side of extrusion disc 4 on the extrusion side thereof is strongly cooled by the flow of water or other coolant directed thereupon as it is evident from FIG. 1. Insulation gap 17 prevents that the heat dissipated on the extrusion side of the die is replenished by a heat flow from the inlet side of the extrusion die. the heat on the inlet side is supplied nearly exclusively from the heat ducts 6 which via inlet bores 18 and corresponding symmetric outlet bores (not shown) are supplied with a flow of a heating medium. The inlet bore for ducts 6 is coupled by a threaded coupler or connector 19 to a source for a heating medium (not shown). Insulation gap 17 which overlies bores 5 must extend in the direction of the inlet side of the extrusion die, so that it prevents the heat released on the extrusion side of the die from flowing out of the part of the extrusion die including the inlet portion of bores 5. This heat flows almost exclusively from the heating ducts 6 through which a heating medium is passed via inlet bores 18 and symmetrical outlet bores which are not shown. The inlet bore 18 is connected to a feed pipe, which is not shown, by means of a threaded connection 19. In the part of the extrusion die including the inlet portion of bores 5, the extrusion die is maintained at the required high temperature by the heat content of the synthetic plastic and additionally by the heat supplied by the heating ducts. When passing through the portion of bores 5 which is formed within insert 16, the strands of synthetic plastic begin to cool on the surface without causing a clogging of the bore.

Tests have shown that the danger of clogging of the bores is reduced by an extrusion die according to the invention to a surprising degree. In other words, the operational reliability of the extrusion die with respect to the danger of clogging of the bores therein has been improved beyond theoretical expectations.

To facilitate manufacture of the die, gap 17 is defined within the body of the die by a ring 20 which is separated from insert 16. The insert is mounted by suitable fastening means such as screws 21 on the extrusion die and thus can be rapidly and conveniently exchanged.

It has been found that with extrusion dies designed for under-water granulation, the wear and tear experienced due to the knives can be very considerable. Easy exchangeability of components subject to high wear and tear is obviously very desirable. The insert 16 which is in the form of an annular disc, is preferably made of a material highly resistant to wear and tear. Bore holes 22 serve for receiving mounting screws for securing the extrusion die to the device.

Figure 4:
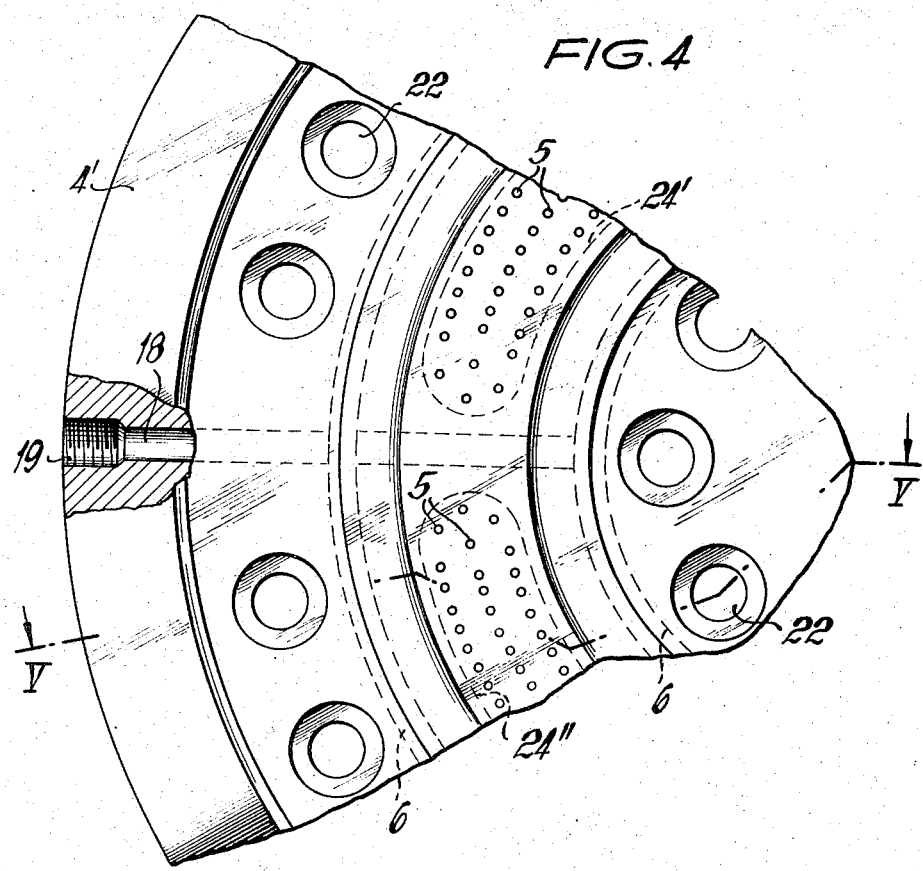
FIG. 4 is a fragmentary plan view of the extrusion sides of a modified extrusion die, said die including on its inlet side inserts in the form of annular segments.
Figure 5:
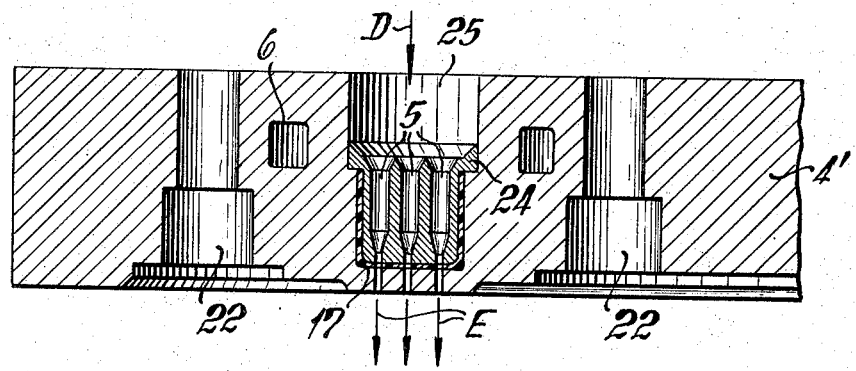
FIG. 5 is a section of the extrusion die according to FIG. 4 taken along line V—V.

According to the embodiment of the extrusion die shown in FIGS. 4 and 5, the insulation gap 17 is defined by the body of an extrusion die 4' and by an annular insert 24. This insert includes the inlet portion of nozzle bores 5 and accordingly is fitted in a recess 25 on the inlet side of the extrusion die. The extrusion portion of the nozzle bores extends through the body of the extrusion die itself. To permit disposition of inlet bores 18 for the heating medium in radial direction insert 24 is divided into two segments 24' and 24''. Fastening by means of screws or other fastening means is not required.

The other reference numerals used in FIGS. 4 and 5 refer to the same components as corresponding reference numerals used in FIGS. 1 to 3.

Figure 6:
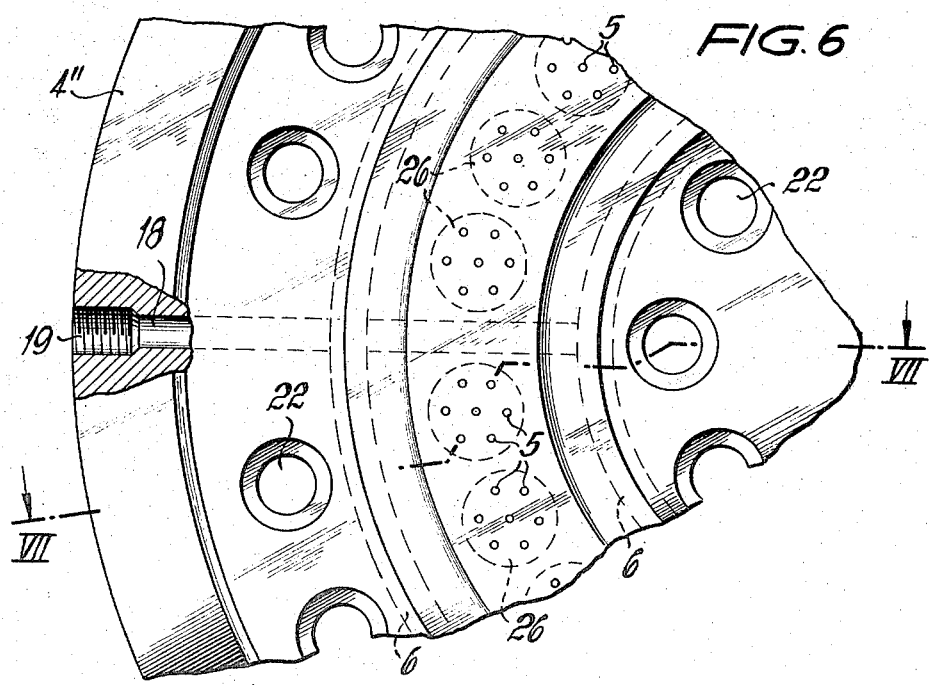
FIG. 6 is a fragmentary plan view of the extrusion side of another modification of the extrusion die, said die having cylindrical inserts on its inlet side.
Figure 7:
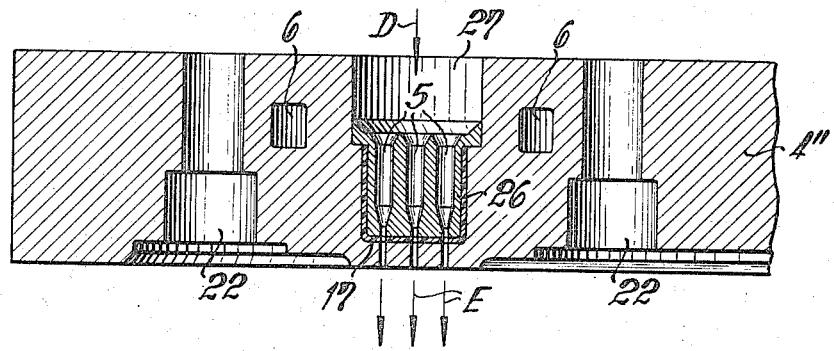
FIG. 7 is a section of the extrusion die according to FIG. 6 taken along line VII—VII.

The embodiment of the extrusion die shown in FIGS. 6 and 7 comprises nozzle bores 5 which are arranged in groups. The insulation gap 17 is formed by cylindrical inserts 26 which are inserted from the inlet side of an extrusion die 4'' into corresponding bores 27. The extrusion portion of the bores 5 extends within the body of the extrusion die 4'', similar to the arrangement of FIGS. 4 and 5.

Figure 8:
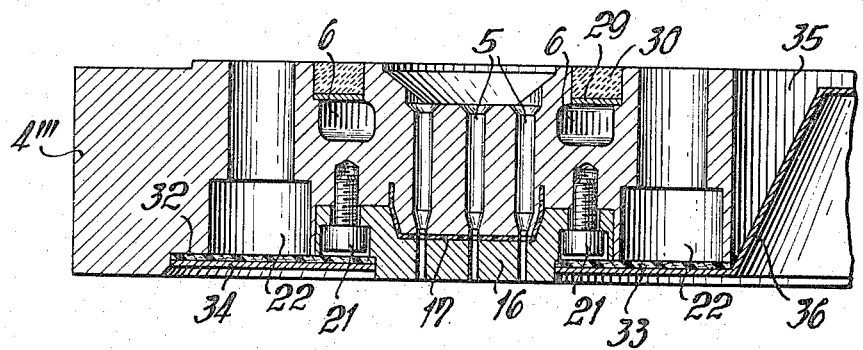
FIG. 8 is a modification of the extrusion die according to FIG. 2 also taken on line III—III.

FIG. 8 shows an extrusion die which is somewhat different from that according to FIG. 3. The insulation gap 17 is continued in the direction of the inlet side by an annular cut-out in the body of an extrusion die 4'''. However, the ring 20 as shown in FIG. 3 is eliminated. The ducts 6 for the heating medium are closed by a sheet metal ring 29 and a welding or soldering seam 30. The locations of the bores 22 for mounting screws for the extrusion die and for screws 21 are closed off from the space containing the granulating water by annular discs 32 and 33. These discs may be made of a suitable synthetic material reinforced by fiberglass. The annular disc 32, in turn, is covered by an annular disc 34 made of a sheet of, for instance steel, and a hood 36 also made of sheet metal such as a steel sheet covers the annular disc 33 and the center bore 35 of the extrusion die.

In all the exemplifications of the extrusion die as described and disclosed herein, the cross-sectional shape of the insulation gap, its position in reference to the face sides of the die and the nozzle bores and its width and strength are substantially the same. It is desirable to make the insulation gap as narrow as possible to prevent or at least to impede an exchange between the insulation material in the gap and the plastic material flowing through the bores. The lower limit of the width of the gap is dependent upon the required insulation action. Tests have shown that widths of the gap in the order of a few tenths of a millimeter are usually entirely satisfactory, and that in some instances even narrower gaps can be used. The width of the insulation gap is preferably somewhat larger in the part of the gap parallel to the flow direction than in the gap part transverse thereto.

While the invention has been described in detail with respect to certain now preferred examples and embodiments of the invention, it will be understood by those skilled in the art, after understanding the invention, that various changes and modifications may be made without departing from the spirit and scope of the invention, and it is intended therefore, to cover all such changes and modifications in the appended claims.

What is claimed is:

1. A granulating device for granulating synthetic plastic material in a flowable stage, said device comprising:

a generally plate-shaped extrusion die having an inlet side and an extrusion side, said die including a plurality of nozzle bores extending crosswise through the die and an insulation layer interposed between the inlet side and the extrusion side of the die, said insulation layer being constituted by a coherent gap extending lengthwise substantially parallel to said bores encompassing the same and also parallel to the extrusion side of the die;

cooling means for cooling the extrusion side of said die;

cutting means movable parallel and adjacent to the extrusion side of the die for cutting material emanating from the extrusion side of the die to effect granulation of the material; and feed means for pressure feeding material to be granulated to the inlet side of the die.

2. The granulating device according to claim 1 wherein said extrusion die comprises two parts, each of said parts including portions of said nozzle bores, one of the parts containing the portion of the bores extending from the inlet side and the other part the portion of the bores extending from the extrusion side of the die.

3. The granulating device according to claim 1 wherein one part of the extrusion die including the portion of the bores extending from the inlet side of the extrusion die defines one side of said insulation gap and another part of the die is in the form of an insert including the portion of the bores extending from the extrusion side defines the other side of said insulation gap, said insert being an annular disc detachably secured to said one part of the extrusion die.

4. The granulating device according to claim 1 wherein said insulation gap is defined on one side by a part of the extrusion die including the portion of all the bores terminating at the extrusion side of the die and is defined on the other side by an annular insert including the portion of all the bores extending from the inlet side of the die.

5. The granulating device according to claim 4 wherein said annular insert is subdivided into segments.

6. The granulating device according to claim 1 wherein said insulation gap is defined by cylindrically-shaped inserts each including a portion of several bores extending from the inlet side of the die and by recesses in the body of the extrusion die, each of said recesses receiving therein one of said cylindrical inserts.

7. The granulating device according to claim 1 wherein a material having a low heat conductivity coefficient fills said insulation gap.

8. The granulating device according to claim 7 wherein said filler material in the insulation gap is the same synthetic plastic material as the material to be granulated with the granulating device.

9. The granulating device according to claim 1 wherein a synthetic plastic material having a low heat conductivity coefficient fills said insulation gap, said filler material having a softening temperature higher than the softening temperature of the synthetic plastic material to be granulated with the granulating device.

* * * * *